Oct. 27, 1970 P. BACQUENOIS ET AL 3,537,034

SOLID STATE MODULATORS

Filed April 12, 1967 4 Sheets-Sheet 1

SOLID STATE MODULATORS

United States Patent Office 3,537,034

Patented Oct. 27, 1970

3,537,034

SOLID STATE MODULATORS

Pierre Bacquenois, Paris, Georges Duval, Boulogne, and Simon Talmasky, Paris, France, assignors to C.I.T.-Compagnie Industrielle des Telecommunications, Paris, France Filed Apr. 12, 1967, Ser. No. 630,377

Claims priority, application France, Apr. 12, 1966, 57,322; Feb. 17, 1966, 95,111; May 20, 1966, 62,403; June 3, 1966, 64,073; Sept. 19, 1966, 76,848

Int. Cl. H03b *3/04*

U.S. Cl. 332—16 13 Claims

ABSTRACT OF THE DISCLOSURE

A family of modulators, some functioning by cut-off and others by reversal, which are nontransparent to the carrier frequency and are asymmetrically energized, the modulators being comprised solely of transistors and/or diodes, resistors, capacitors, etc. which are susceptible to fabrication in integrated circuit form and not requiring non-integrable circuit elements such as transformers, inductors, etc.

This invention relates to new and improved electric signal modulators for modulating a carrier frequency F with a signal frequency *f*, and which is nontransparent to the carrier frequency F.

More particularly, the invention relates to a type of modulator in which all of the energization is asymmetric, i.e. it can be energized directly, without interposition of transformers by an asymmetric source of carrier frequency F and by an asymmetric source of signal frequency *f*; yet it is nontransparent to the carrier frequency F and it can discharge directly, without interposition of transformers, into an asymmetric loop impedance, for instance the input impedance of an amplifier, loop filter, coaxial cable and so on.

The modulators of the invention, by reason of the fact that they are constructed by means of transistors, diodes, resistors, capacitors, to the exclusion of any inductance or transformer, lend themselves well to construction by the printed circuit technique.

In a functional sense, the modulators of the invention are one of the types of modulators known as cut-off modulators or reverse modulators. A summary will be given below of the main feature of these two types of modulators, in order to bring out the features of the invention and the compared advantages of the various forms of execution, both in relation to each other and to known forms.

The principle of the cut-off modulator is to break a circuit through which a modulating current is flowing, called signal current, of frequency (instantaneous) *f*, pulse $\omega$, at the frequency of a carrier frequency F, pulse $\Omega$.

As an example, take a signal source of electromotive force $e=E\cos\omega t$, with internal impedance R, discharging into a resistor R. When the circuit is open the current in the load is nul; when the circuit is closed, the current in the load is equal to $$\frac{e}{2R}=\frac{E\cos\omega t}{2R}$$

The cut-off current is expressed by multiplying the quantity $$\frac{E\cos\omega t}{2R}$$

by a function $f(t)$ which takes sucessively the values +1 and 0 at a frequency equal to the carrier frequency.

This periodic function, with period equal to $2\pi/\Omega$, is capable of development in Fourier series. The development has the form $$\frac{1}{2}+\frac{2}{\pi}\left(\cos\Omega t-\frac{1}{3}\cos 3\Omega t+\frac{1}{5}\cos 5\Omega t-\ldots\right)$$

In these conditions, the current in the charge is expressed as follows:

$$i=\frac{E\cos\omega t}{2R}\cdot f(t)=\frac{E\cos\omega t}{4R}+\frac{E}{R}(\cos\Omega t.\cos\Omega t$$
$$-\frac{1}{3}\cos\omega t.\cos 3\Omega t+\frac{1}{5}\cos\omega t.\cos 5\Omega t-\ldots)$$

By converting these cosine products into cosine sums, there is obtained:

$$i=\frac{E\cos\omega t}{4R}+\frac{E}{2\pi R}(\cos(\Omega+\omega)t+\cos(\Omega-\omega)t$$
$$-\frac{1}{3}\cos(3\Omega+\omega)t-\frac{1}{3}\cos(3\Omega-\omega)t+\frac{1}{5}\cos(5\Omega-\omega)t$$
$$+\frac{1}{5}\cos(5\Omega+\omega)t\ldots)$$

The output current accordingly has a component at the frequency of the signal (first term of the second expression) and a modulated current which is composed of an infinity of components of frequencies $(2n+1)\ F\pm f$, of amplitude which varies respectively as $$\frac{1}{2n+1}$$

The frequency F does not appear there. In general, the useful component is one or other of the components of the first order $F+f$ or $F-f$. The others are eliminated by filtering.

The maximum power that the current signal source can supply being expressed as $E^2/4R$ and the power at frequency $(F+f)$, or at frequency $(F-f)$ being $E^2/4\pi 2R$, the attenuation of the modulator is:

$$A=\frac{1}{2}\text{Log}\frac{E^2/R}{2/4\pi}2_R=\frac{1}{2}\text{Log}\,\pi^2+\text{Log}\,\pi$$

whence

A=1.15 Napier (10 db).

The principle of modulation by reversing consists in reversing the current discharged by a signal source (frequency *f*, pulse $\omega$) at the frequency of the carrier frequency (frequency F, pulse $\Omega$).

To take an example, a signal source of electromotive force $E\cos\omega t$, internal impedance R, discharges into a load value R the terminals of which are periodically reversed by means of a reversing circuit controlled by the carrier frequency. During one alternation of the carrier, the current in the load is equal to $$\frac{E\cos\omega t}{2R}$$

and during the other alternating it has the value $$\frac{-E\cos\omega t}{2R}$$

The modulated current is expressed by multiplying the quantity $$\frac{E\cos\omega t}{2R}$$

by a function $g(t)$ which takes successively the values +1 and −1 at frequency equal to the carrier frequency. This periodic function, the period being equal to $2\pi/\Omega$, can be developed in Fourier series, with the form:

$$g(t)=\frac{4}{\pi}\left(\cos\Omega t-\frac{1}{3}\cos 3\Omega t+\frac{1}{5}\cos 5\Omega t-\ldots\right)$$

In these conditions the modulated current is expressed as follows:

$$i=\frac{2E}{\pi R}\left(\cos \omega t.\cos \Omega t-\frac{1}{3}\cos \omega t.\cos 3\Omega t+\frac{1}{5}\cos \omega t.\cos 5\Omega t-\ldots\right)$$

By converting the cosine products into cosine sums, there is obtained:

$$i=\frac{E}{\pi R}\cos(\Omega+\omega)t+\cos(\Omega-\omega)t-\frac{1}{3}\cos(3\Omega+\omega)t$$
$$\frac{1}{3}\cos(3\Omega-\omega)t+\frac{1}{5}\cos(5\Omega-\omega)t\ldots$$

The output current is accordingly composed solely of the modulated current, having the same frequencies as in the preceding case. The carrier frequency F does not appear there, nor does the modulating signal frequency $f$, in contrast to the above case.

By calculating the power collected on the useful side bands of frequency $F+f$ or $F-f$, the value of the attenuation of the commutation modulator can be given:

$$A'=\text{Log }\pi-\text{Log }2,\text{ i.e. }A'=0.45\text{N}(3.9\text{ db})$$

The advantages of modulation by reversing as compared with cut-off modulation are as follows:

less attenuation (difference of 0.7N, i.e. approximately 6 db);
elimination of the modulating signal $f$ in the output spectrum.

On the other hand, modulation by reversing does lead in general to more complicated circuitry.

Apart from the actual modulation spectrum as defined above, other components, resulting from the mounting itself and not from the function of modulation, are found in the output current of a modulator. If the output spectrum contains a component with carrier frequency F, the modulator is said to be "transparent" for the frequency F. The elimination of such component can pose delicate filtering problems. In other cases, in the output spectrum the paired harmonics of the carrier frequency are found, and their elimination is, generally speaking, easier.

Well known examples of cut-off modulators and of reversal modulators are given by the telegraphic blocker and by the ring armature modulator, respectively.

One known form of cut-off modulator is one which has a common base mounted transistor which can receive at two energization terminals the carrier frequency and the signal frequency on one and the same electrode. In the output spectrum of a modulator of this type the carrier frequency F is found, which is a disadvantage, as has been shown above.

Another known modulator gives an effect of short circuit on the signal source, and employs a single transistor, but it is a transistor of the "symmetric" type, and is not very common.

The aim of the invention is accordingly to construct modulators, some functioning by cut-off and others by reversal, having non-transparency to the carrier frequency and all having direct asymmetric energization, comprised solely of transistors and/or diodes, and capacitors.

In accordance with a first form of the invention, a cut-off modulator has two transistors of the same polarity mounted on a common base, their collectors being supplied in common by a source of direct current through a single load resistor; the emitter of a first of the said transistors is connected to a signal source via a resistor, and to a carrier frequency source via a resistor, the carrier frequency source being applied via a capacitor to the base of a third transistor mounted with common emitter, the collector of which, loaded by a resistor, is connected via a capacitor to the emitter of the second of the said transistors.

In accordance with a second form of the invention a reversal modulator has two transistors of the same polarity mounted on a common base, their collectors being supplied in common by a source of direct current via a single load resistor; the emitter of a first of the said transistors is connected to a signal source and to a carrier frequency source via a network formed of three resistors, the said signal source and carrier frequency source being connected via a capacitor to the base of a third transistor mounted with common emitter, whose collector, loaded by a resistor, is connected via a capacitor to the emitter of the second of the said transistors.

In accordance with another form, a reversal modulator has two transistors of the same polarity, their collectors being supplied in common by a source of direct current through a single resistor, i.e. a first transistor mounted with a common base and a second transistor mounted with a common emitter, a signal source and a carrier frequency source being applied to the emitter of the said first transistor and to the base of the said second transistor via a network of three resistors.

A diode may be connected between the emitter of the first transistor and earth for regulating the input impedance of a modulator with transistors of the same polarity.

In accordance with another form, an inversion modulator of generally symmetric structure has two transistors of the same polarity mounted with common base; a carrier frequency source is applied by means of a capacitor to the base of a third transistor mounted as a symmetrizing dephaser with a resistor in the collector circuit and a resistor in the circuit of the emitter, which applies two output voltages at carrier frequency in opposition to the emitters of the said first two transistors respectively via two resistor capacity networks; and a signal source is applied by means of a capacitor to the base of a fourth transistor mounted with symmetrizing dephaser with a resistor in the collector circuit and a resistor in the circuit of the emitter, which applies two output voltages at the frequency of the signal in opposition to the said two emitters via two resistance capacity networks.

A diode may be connected between the emitter of each of the said transistors mounted with common base, and earth.

The two transistors may be mounted with common emitter and may be energized by their bases.

In accordance with another form of the invention, an inversion modulator with complementary transistors, with a single battery, has for instance, beginning at the negative pole of the battery, on one hand the collector of a first PNP transistor whose emitter is connected to earth via a load resistor, on the other hand a resistor in series with the emitter of a second NPN transistor whose collector is connected to earth via the said load resistor, the base of the first transistor being connected to earth via a polarization resistor, the base of the second transistor being connected to the emitter of the same transistor by a polarization resistor and to the base of the first transistor by a capacitor, a carrier frequency source and a signal source being applied to the base of the first transistor via two resistors.

In accordance with another form, a cut-off modulator with complementary transistors, having symmetrical structure, has a pair of transistors mounted with common base, each having collectors loaded by a resistor, the two emitters being energized on the one hand by the two output voltages in phase opposition of a symmetrizing dephaser transistor connected at its base to a carrier frequency source, and on the other hand in parallel via two resistors by a signal source, the transistors of the said pair having their collectors connected via two capacitors to a terminal of a common load resistor the other terminal of which is connected to earth.

In accordance with another form, an inversion modulator with complementary transistors and symmetrical structure has a first symmetrizing dephaser transistor with two output terminals A, B connected to a carrier frequency source, a second symmetrizing dephaser transistor with two output terminals M, N connected to a signal source, a first pair of complementary transistors mounted with common base, each having collectors loaded by a resistor and the emitters excited by the said terminals A, B via two resistors, and by the said terminal N via two resistors, a second pair of complementary transistors mounted with common base, each having collectors connected to the collector of the transistor of the same polarity of the said first pair, and the emitters energized crosswise by the said terminals B, A, via two resistors, a common load resistor having one terminal connected at the common point to collectors of the transistors of one polarity via a capacitor and connected at the common point to the collectors of the transistors of the other polarity, and the other terminal connected to earth.

The complementary associated transistors may be mounted with common emitter and base energized.

A diode may be mounted between each input point of energization of the complementary transistors to regulate the impedance.

In accordance with another form, a cut-off modulator has a transistor mounted in symmetrizing dephaser with two output terminals, connected at its base to a carrier frequency source, the said output terminals energizing via two resistor/capacitor networks two diodes of opposite arrangement, which return to earth by a common resistor, a signal source energizing the said two diodes at the central point of a resistor bridge which unites them.

Impedance regulating diodes may be connected between each of the above-mentioned diodes and earth, preferably in series with a resistor.

In accordance with another form, a reversal modulator has a first transistor mounted with symmetrizing dephaser with two output terminals, A, B, connected at its base to a carrier frequency source, a second transistor mounted with symmetrizing dephaser with two output terminals M, N, connected at its base to a signal source, a first unit of two arms in parallel, each formed of a resistor and of a diode, one arranged oppositely to the other arm, one end of which is connected to the said terminal A and the other end of which is connected to one end of a resistor which returns to earth, a second unit of identical construction to the said first unit, one end of which is connected to the said terminal B and the other end to the said end of the said resistor, a first bridge of resistors connecting two diodes of differing orientation in each unit, having its mid point connected to the said terminal M, a second bridge of resistors connecting the other two diodes having its midpoint connected to the said terminal N.

Other objects, features and many of the attendant advantages of this invention will be appreciated more readily as the same becomes better understood by reference to the following detailed description, when considered in connection with the accompanying drawings, and wherein.

Figure 1:
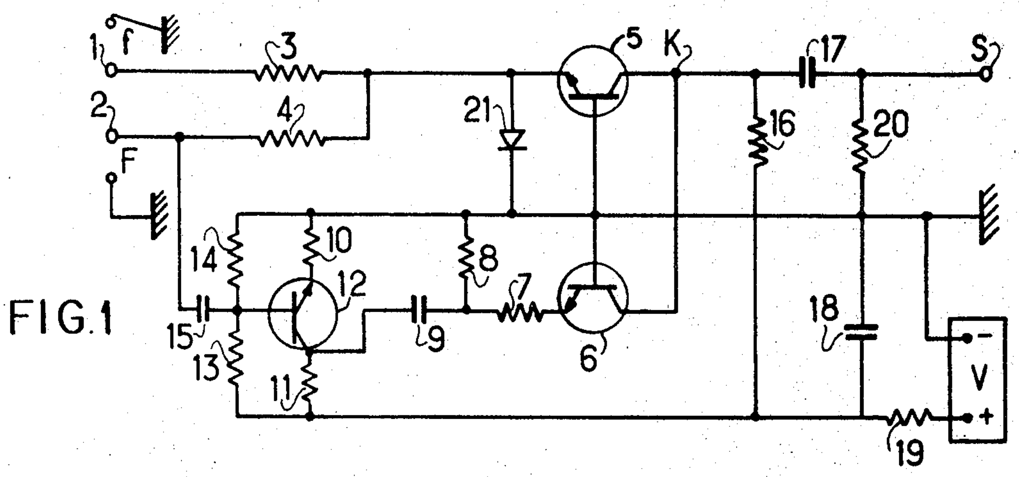
FIG. 1 is a schematic circuit diagram of a cut-off, asymmetric modulator constructed in accordance with the invention of transistors, diodes, resistors, and other components which lend themselves to construction by printed circuit techniques, and which is non-transparent to the carrier frequency.

In FIG. 1, the modulator has to input terminals 1 and 2, to which the frequencies signal $f$ and carrier F respectively can be applied, each connected to the first terminal of one of two resistors 3 and 4, whose second terminals have a common point connected to the emitter of a first transistor 5 mounted with common base. The first terminal of the resistor 4, connected to the energization terminal 2 above mentioned, is also connected via a capacitor 15 on the one hand to the base of a second transistor 12 mounted with common emitter via a polarization resistor 10, on the other hand to the common terminal of two polarization resistors 13 and 14 connected in series across a source of bias voltage V through a resistor 19. The juncture of resistors 13 and 14 is connected to the base of the transistor 12. The collector of the transistor 12 is connected to a terminal of a load resistor 11 and by a capacitor 9 and a resistor 7, to the emitter 61 of a third transistor 6, whose base is connected to earth. The common terminal of the capacitor 9 and the resistor 7 is connected to a terminal of a resistor 8. The collectors of the two transistors 5 and 6 have a common connection K, which is connected on the one hand by a capacitor 17 to a first end of a load resistor 20 forming an output terminal S. On the other hand the common connection K is connected by a resistor 16 across a capacitor 18 and through a resistor 19 to the positive terminal of the bias or polarization source V. The negative terminal of source V is connected to the earth terminal to which is connected the second terminal of the load resistor 20. A diode 21 is connected between the emitter and the earthed base of the transistor 5.

The second terminals of the resistors 14, 10 and 8 are connected to the earth terminal, the second terminals of the resistors 13 and 11 are connected to the positive terminal of the source V by the resistor 19.

The functioning of the assembly in accordance with FIG. 1 is as follows: the carrier frequency F is applied to the emitter of the transistor 5 having its base connected to earth, and to the emitter of the transistor 6, also having an earthed base, after passage through the transistor 12 with common emitter, the role of transistor 12 being to dephase the said frequency F by $\pi$. It follows that the transistor 5 is passing current while the transistor 6 is blocked and conversely, and that the carrier current at the output terminal S is full wave rectified on its two alternations. This output current represents a periodic current of fundamental frequency 2F, a current which does not contribute any sinusoidal component to the frequency F but only a direct component and all the harmonic pairs of F that are relatively easy to eliminate from the useful side bands $(f-F)$, $(f+F)$. When the signal frequency $f$ is applied to the energization terminal 1, when the emitter of 5 is negative, the transistor 5 is conductive, its input impedance is very low and accordingly the coupling between the energizations "signal" 1 and "carrier" 2 is very low, at the same time the diode 21 is blocked. When the emitter of 5 is positive, the transistor 5 is blocked, its input impedance is very high, but at the same time the diode 21 is passing current and its low impedance ensures the continuity of the decoupling of the two sources, as well as the regularity of the input impedance.

As a result the assembly is realized of a cut-off modulator with elimination of the carrier frequency in the output spectrum.

Figure 2:
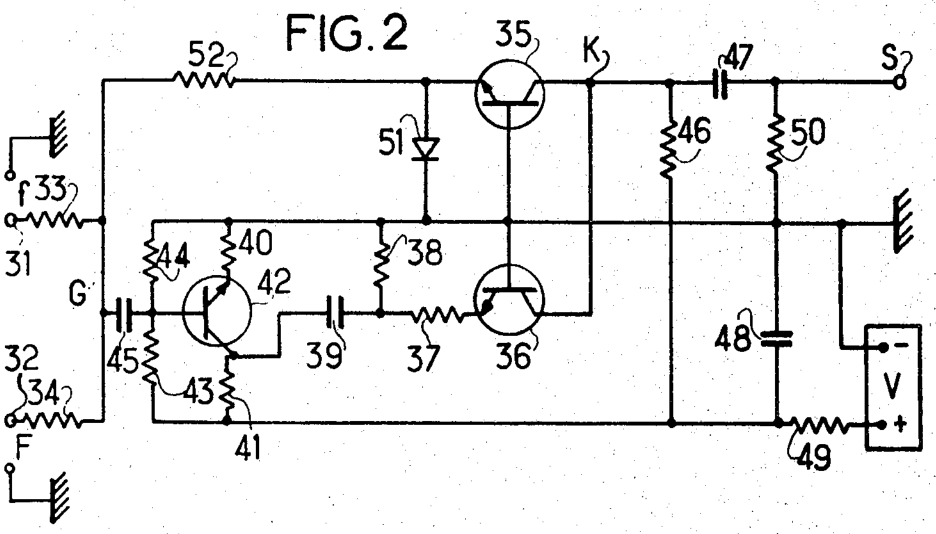
FIG. 2 is a schematic circuit diagram of a modulator according to the invention which is similar to the modulator of FIG. 1, but which operates in accordance with the inversion technique.

To obtain also the elimination of the frequency signal incident in the output spectrum, the modifications in acaccordance with FIG. 2 have been made to the above assembly, which figure represents an inversion modulator where the components 1 to 21 of FIG. 1 have the reference numbers 31 to 51.

In FIG. 2, each of the two energization terminals 31 and 32 is respectively connected to the first terminal of one of the two resistors 33 and 34 whose second terminals have a common terminal G.

This common point G is connected on the one hand by a resistor 52 to the common junction to the diode 51 and of the emitter of the transistor 35, and on the other hand by the capacitor 45 to the midpoint of the two resistors 43 and 44 and to the base of the transistor 42.

The functioning of the assembly in accordance with FIG. 2 differs from that of FIG. 1 in the sense that the signal frequency $f$ is applied at the same time as the carrier frequency F to the transistors 35 and 42. It follows that at the output terminal S the carrier current represents as above a periodic current of fundamental frequency 2F and that the signal $f$ passes through the system permanently, suffering a dephasing of $\pi$ at each alternation of the carrier.

The modulator in accordance with the assembly of FIG. 2 accordingly produces modulation by inversion with suppression of the carrier frequency and of the signal (incident) frequency in the output spectrum.

Figure 3:
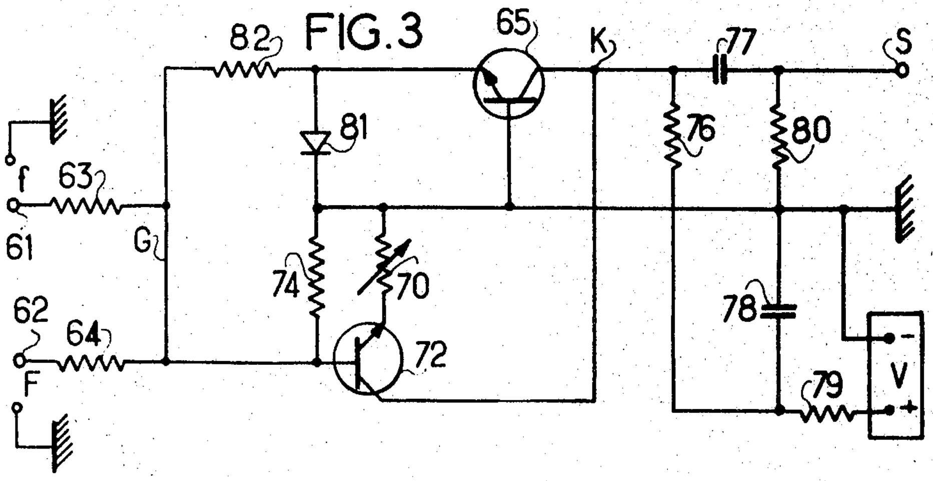
FIG. 3 is a schematic circuit diagram of still a different form of the invention which employs only two transistors.

The assembly of FIG. 3, where the references 31 to 35, 40, 42, 44, 46, to 52 are replaced by 61 to 65, 70, 72, 74, 76 to 82 respectively, is a simplification of the assembly in accordance with FIG. 2. The two energization terminals 61 and 62 are respectively connected to the resistors 63 and 64 having the common terminal G, which is connected on the one hand to the resistor 82 connected to the common connection of the diode 81 and of the emitter of the above-mentioned transistor 65 and on the other hand to the base of the above-mentioned transistor 72.

A variable resistor 70 is connected between the emitter of the transistor 72 and the earth terminal. The collectors of the transistors 72 and 65 have a common point K which is connected to the load resistor 80 one end of which forms the output terminal S, via the capacitor 77.

In the assembly of FIG. 3, the transistors 65 and 72 fulfill the functions of dephasing and of cutting out at the frequency of the carrier frequency. The assembly functions by inversion so that for the alternations of the carrier frequency making the potential at G negative, the transistor 65 is conductive and the transistor 72 is blocked, and inversely for the alternations making the potential of the point G positive. Accordingly, at the output S one collects the two carrier alternations rectified as a result of a functioning analogous to that of FIG. 2, the equality of the two alternations being realized by adjusting the resistor 70.

If the signal is applied to the energization terminal 61 with the carrier current applied by the terminal 62 at a sufficiently high level to control the two transistors, when the transistor 65 is passing current, the signal is transmitted to the output without dephasing; when the transistor 72 is passing current the signal is transmitted to the output terminal S with dephasing of $\pi$.

It follows that there is elimination of the carrier frequency and of the incident frequency in the output spectrum.

It should be observed that in this assembly the resistors 63 and 64 decouple the carrier and signal sources, the diode 81 having itself the role of making the input impedance practically regular.

In such an assembly the input impedance is entirely defined by the resistors 63, 64, 82 and 74.

For improved decoupling without loss or power, one can connect to each of the terminals 61 and 62 by means of a transistor.

The various assemblies and their parameters have been selected by way of example only, and can be modified without thereby going beyond the scope of the invention.

Figure 4:
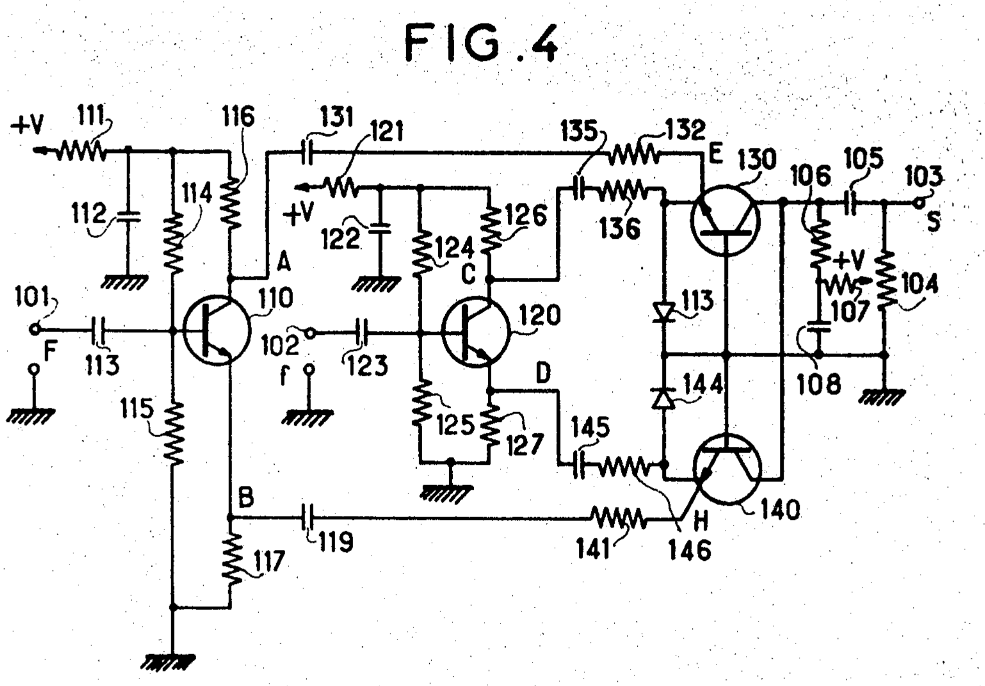
FIG. 4 is a schematic circuit diagram of an inversion type modulator according to the invention wherein the two input frequencies to be modulated are converted from an asymmetric to symmetric form prior to modulation.

In FIG. 4 a transistor 110, supplied by a source of direct current V via a decoupling unit consisting of a resistor 111 and a capacitor 112, has its base polarized by two resistors 114, 115. Its collector A is supplied via a resistor 116, and its emitter B returns to earth by a resistor 117. A carrier frequency source F is connected to a terminal 101 connected to the base of the transistor 110 by a capacitor 113.

Two NPN transistors 130, 140 supplied by the said source of direct current V through a decoupling unit consisting of a resistor 107 and a capacitor 108, have a load resistor 106 common to their two collectors. Their bases are connected to earth. The emitter of transistor 130 is connected to the collector A of transistor 110 by a network consisting of resistor 132 and capacitor 131 in series. The emitter of transistor 140 is connected to the emitter B of transistor 110 by a network consisting of a resistor 141 and a capacitor 119 in series.

The frequency signal $f$ is injected on the emitters of the transistors 130 and 140 by means of a dephasing transistor 120. The transistor 120 is supplied by the source of direct current V via a decoupling unit consisting of a resistor 121 and a capacitor 122. Its base, polarized by the resistors 124, 125, is connected, via a capacitor 123, to a source of signal frequency $f$, applied to the terminal 102. The collector C is supplied via a resistor 126, the emitter D returns to earth through a resistor 127. The point C is connected to the emitter E of transistor 130 by a network consisting of a capacitor 135 and a resistor 136 in series. The point D is connected to the emitter H of the transistor 140 by a network consisting of a capacitor 145 and a resistor 146 in series.

The modulated spectrum is supplied to asymmetric output terminal 103, connected to earth by an output resistor, 104, and connected to the two collectors of the said transistors 130, 140 by a capacitor 105.

During operation the transistor 110 functions as a dephaser and the carrier frequency voltages F which appear at the points A and B are in phase opposition. During the carrier alternations making the potential of the point E positive and the potential of the point H negative, the transistor 130 is blocked and the transistor 140 conductive. During the remaining alternations the reverse is the case. The transistors 130 and 140 are accordingly blocked and conductive, one being blocked when the other is conductive and vice versa. As these transistors have the same polarity, their collector currents are in the same direction. As a result, with the provision of the equality of discharge of these two transistors, one finds again in the output resistor 104 the carrier frequency current F rectified at its two alternations. This current is periodic, the period being equal to half the period of the carrier frequency. As a result, one collects in the resistor 104, as well as the modulation spectrum $F\pm f$, $3F\pm f$, $5F\pm f$ and so on, the harmonic pairs of the carrier frequency, to the exclusion of the carrier frequency itself.

As far as concerns the residue of current at the signal frequency $f$, one can state the following: since the transistor 120 functions as a dephaser, the modulating voltages appearing at the points C and D are in phase opposition. For the alternations of the carrier frequency which make the transistor 130 conductive and block the transistor 140 the modulating signal from the point C is found again in the resistor 104 without dephasing. For the alternations of the carrier frequency which make the transistor 140 conductive and block the transistor 130, the modulating signal from the point D is found again in the resistor 104 without dephasing. As the signals at C and D are in opposition, one collects in 104 the modulating signal that has suffered inversion at the rhythm of the carrier frequency. The system accordingly produces a modulation by inversion, with suppression of the frequency of the signal in the output current.

In a variation, the modulator in accordance with FIG. 4 can be constructed with the said two transistors mounted with common emitter and energized by their bases.

Figure 5:
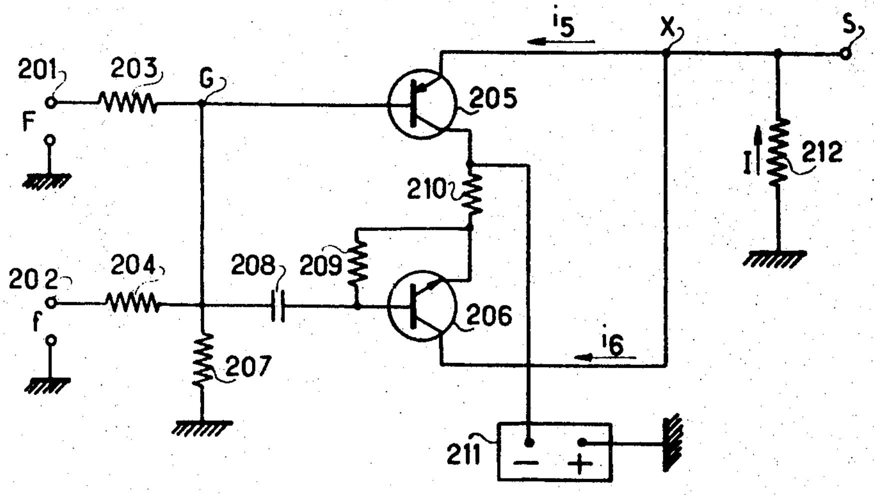
FIG. 5 is still a different form of the invention employing only two transistors.

The assembly of FIG. 5 comprises three asymmetric energization terminals: one energization terminal 201 of the carrier frequency F, one energization terminal 202 of the signal frequency *f* and one output terminal S on which one can obtain the modulation products. The two terminals 201 and 202 are connected respectively by two resistors 203 and 204 having a common terminal G, to the two bases of two complementary transistors 205 and 206, the transistor 205 being for instance of the PNP type and the transistors 206 of the NPN type. The electrical connection between G and the base of the transistor 206 is interrupted by a capacitor 208 which can allow to pass without attenuation the carrier F and the signal *f*. An earthed resistor 207 is connected to the point G. A source of polarization voltage 211 that can supply a voltage V whose positive terminal is connected to earth, has its negative terminal connected on the one hand directly to the collector of the transistor 205 and on the other hand via a resistor 210 to the emitter of the transistor 206. A resistor 209 is connected between the emitter and the base of the transistor 206 and polarizes the latter. The emitter of the transistor 205 and the collector of the transistor 206 have a common connection X connected to one end of a load resistor 212 the other end of which is connected to earth so that the first end forms the output terminal S. At rest the two transistors are in the blocked state.

The arrows $i_5$, $i_6$ and I show the currents passing through the transistors 205 and 206 and the load resistor 212 in the conventional sense.

The functioning of the assembly in accordance with FIG. 5 is as follows: The carrier F is applied by the energization terminal 201 to the respective bases of the two transistors 205 and 206 of complementary type. For the alternations of F when 201 is negative, the transistor 205 is conductive and the transistor 206 is blocked and inversely during the following half cycle, the state passing from one to the other of the two transistors 205 and 206 giving a current with frequency 2F of the same polarity in the load resistor 212. When the signal *f* is applied to the energization terminal 202, at the same time as the carrier current applied to the energization terminal 201 at a peak level, substantially lower than the peak level of the carrier current, there is produced a variation of the amplitude of the carrier current.

The successive alternations of the carrier current make the transistors 205 and 206 pass current successively, one after the other. The conductive states of the transistors 205 and 206 give the same result in the load 212 (current circulating in a defined direction).

In other words:

(1) The opening of the transistor 205 and the positive alternation of the carrier give a current circulating in one direction.

(2) The opening of the transistor 206 and the negative alternation of the carrier give a current of the same direction as the above.

Action of the signal (i.e. for instance a positive signal) during several alternations of the carrier, is as follows:

(a) The opening of the transistor 205 gives a current in one direction in the charge, as a result of the carrier, but to the positive action of the carrier is added the positive action of the signal.

(b) The opening of the transistor 206 produces a positive current in the charge due to the carrier, but added to the − (negative) action of the carrier is the + (positive) action of the signal.

The result of the action of the carrier and of the signal is a modulation by inversion.

The two resistors 203 and 204 decouple the two sources of carrier frequency and signal frequency before these frequencies reach the two transistors 205 and 206.

Figure 6:
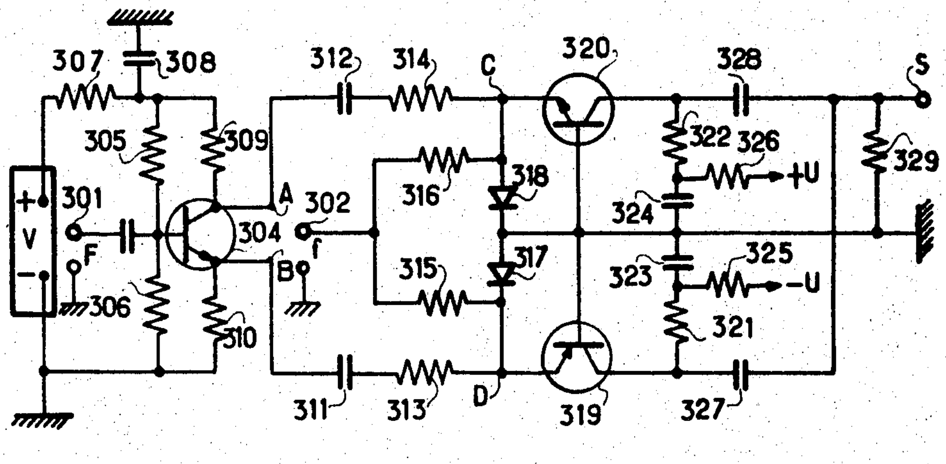
FIG. 6 illustrates an embodiment of the invention wherein a cut-off type modulator is provided along with circuit means for converting an asymmetric input signal into symmetrical components prior to modulation.

In FIG. 6 the modulator has two energization terminals 301 and 302 to which one can apply respectively the carrier frequency F and the signal frequency *f*. The first energization terminal is connected by a capacitor to the base of a transistor 304 polarized as is known to one skilled in the art. The base is connected to the common connection between two resistors 305 and 306, the collector and the emitter are connected by resistors 309 and 310 respectively to the positive terminal of a supply source V by a resistance 307 decoupled by a capacitor 308. The negative terminal of the said source V is connected to earth. The two above-mentioned resistors 305 and 306 are likewise connected respectively to the positive terminal of the source V, by the resistor 307, and to earth.

The collector of the transistor 304 is connected at A to a capacitor 312 in series with a resistor 314 connected at C to the emitter of a transistor 320 for instance of NPN type, mounted with common base. The emitter of the transistor 304 is connected at B to a capacitor 311 in series with a resistor 313 connected at D to the emitter of a transistor 319 mounted with common base, complementary to the transistor 320 above-mentioned, with which it forms a pair. A resistor 315 and a diode 317 are connected between D and respectively the energization terminal 302 and the earth terminal. A resistor 316 and a diode 318 are connected between C and respectively the energization terminal 302 and the earth terminal. The collectors of the two complementary transistors 319 and 320 are connected in common, via two capacitors 327 and 328, at E, to an end of a load resistor 329 forming an output terminal S. The complementary transistors 319 and 320 are polarized in the following manner, respectively: the collector of 319 by a resistor 321 in series with a resistor 325, decoupled by an earthed capacitor 323, connected to a negative terminal of a first source of potential U, whose positive terminal is connected to earth, and the collector 320 by a resistor 322 in series with a resistor 326, decoupled by an earthed capacitor 324, connected to a positive terminal of a second source of potential U whose negative terminal is connected to earth.

When the carrier frequency is applied to the energization terminal 301, the carrier voltages appearing at the points A and B are in phase opposition, their amplitudes will be equal by regulation of the values of the resistors 309 and 310. In a first phase, for the alternations of the carrier frequency making the potential of A positive and that of B negative, the two transistors 319 and 320 are blocked, and it follows that no current passes in the load resistor 329. In a second phase for the alternations of the carrier frequency making the potential of A negative and that of B positive, the two transistors 319 and 320 are conductive. There appears in the collectors of the two complementary transistors 319 and 320 opposite currents, and it follows that there is never any current resulting from the carrier in the load resistor 329.

When the signal frequency is applied to the energization terminal 302, the transistors 319 and 320 being controlled by the carrier frequency as above-mentioned, in the course of the first phase during which the pair of complementary transistors 319 and 320 are blocked, the signal is not transmitted in the load resistor 329. During the second phase, the transistors 319 and 320 are conductive, the signal is transmitted by the two transistors mounted with common base with the same phase, in the load resistor 329.

An assembly of this type accordingly produces a cut-off modulator of the signal at the frequency of the carrier frequency, and makes it possible to obtain at the output, modulation products totally exempt from carrier frequency. The diodes 317 and 318 are blocked when the transistors 319 and 320 are conductive, and inversely. It follows that during the first phase the diodes are passing current and their low impedance ensures decoupling between the two energization terminals 301 and 302. During the second phase the transistors are conductive, their input impedance is very low, as well as the connection between the energization terminals 301 and 302. The diodes accordingly make it possible to ensure permanent regularity of the input impedance, and of the decoupling between the energization terminals 301 and 302.

In a variation, the complementary associated transistors can be mounted with common emitter and can be energized by their bases.

Figure 7:
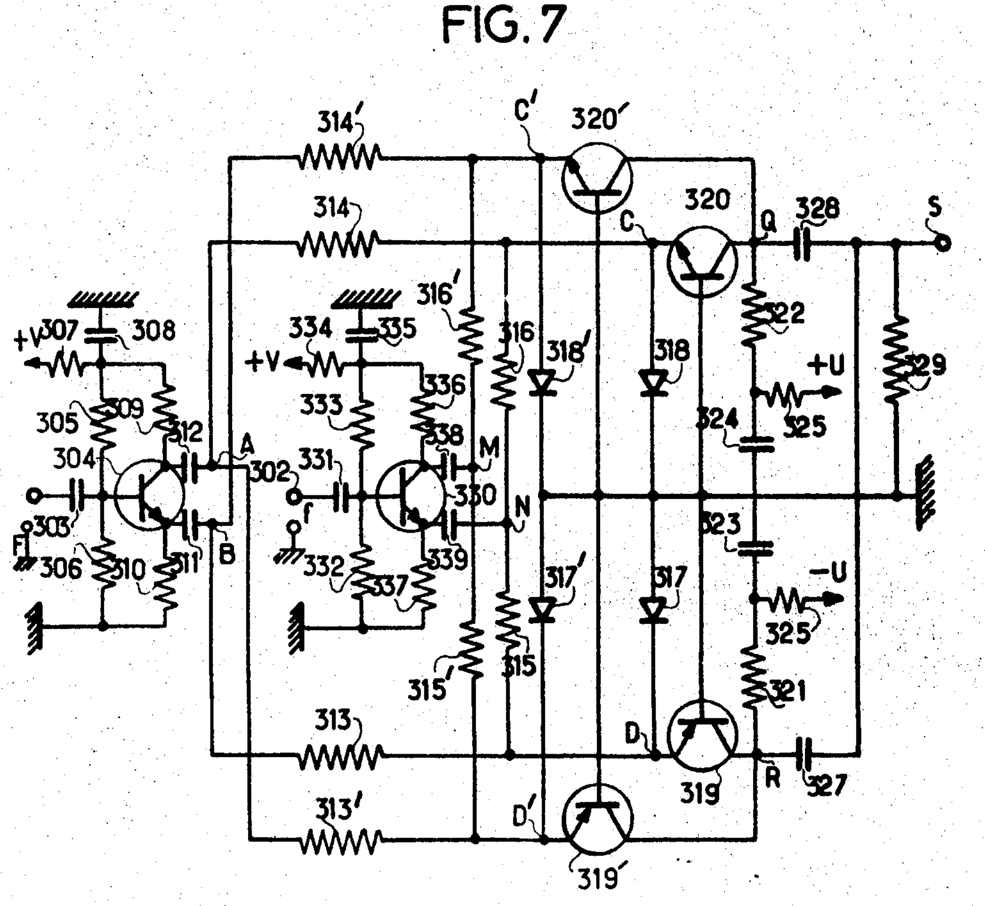
FIG. 7 is a schematic circuit diagram of an embodiment of the invention employing properly oriented pairs of transistors as the modulating components of an inversion type modulator.

In FIG. 7, the identical reference numbers or those havign a prime in relation to the numbers of FIG. 6, represent the same elements. In FIG. 7 the points A and B are connected on the one hand respectively by the resistors 314 and 313 at C and D to the emitters of a first pair of complementary transistors 320 and 319 mounted with common base, and on the other hand respectively by the resistors 313' and 314' at D' and C' to the emitters of a second pair of complementary transistors 319' and 320' mounted likewise with common base. From one pair to the other, the transistors of the same polarity have their collectors directly connected in common, i.e. at Q and R, whereas their emitters are connected respectively to A and B in phase opposition. Two resistors 315 and 316, or 315' and 316' connect respectively D and C or D' and C', to terminals N and M. The two terminals M and N are connected by two capacitors 338 and 339 to the collector and emitter respectively of a transistor 330 whose base is connected by a capacitor 331 to the energization terminal 302 of the signal frequency. The above-mentioned transistor 330 is polarized as is the transistor 4, by the resistors 332 and 333 whose mid-point is connected to the base and the ends are connected to earth and to a source of voltage V by a resistor 334 disconnected by the capacitor 335, by the resistor 336 connected between the collector and the source V and the resistor 337 connected between the emitter and earth.

In accordance with the functioning of the assembly of FIG. 6, it arises that the two transistors of the same pair are blocked or conductive during the same alternations of the carrier frequency. In FIG. 7 each of the pairs functions identically in relation to the carrier frequency, which thus is found to be totally eliminated at the output.

However, from one pair to the other, the connections between the emitters of the transistors of the same polarity and the electrodes of the transistor 4 being crosswise, the first pair of transistors 319 and 320 will be conductive when the second pair of transistors 319' and 320' are blocked, and inversely. For the alternations of the carrier frequency making the first pair of transistors 319 and 320 conductive, the signal from N is transmitted to the output resistor 329. By reason of the fact that M and N are connected to the two collector and emitter electrodes of the transistor 330 supplied by the signal frequency, their voltages are in phase opposition, the assembly accordingly produces a modulation by inversion, bringing about the elimination of the signal frequency $f$ at the output.

In this assembly the diodes 317 and 318, 317' and 318' regularize the impedance of input and ensure a very low coupling between the energization terminals.

In the functioning of these two assembles it should be understood that the total suppression of the carrier is a purely theoretical objective, in actual fact one obtains a stable attenuation greater than 5 Napier, a result which is a distinct improvement on international standardization which requires an attenuation of 4 Napier.

The mounting with common base of the transistors 319, 319' and 320, 320' has been taken as preferred example, but assembly of these transistors with common emitter leads to comparable results.

Figure 8:
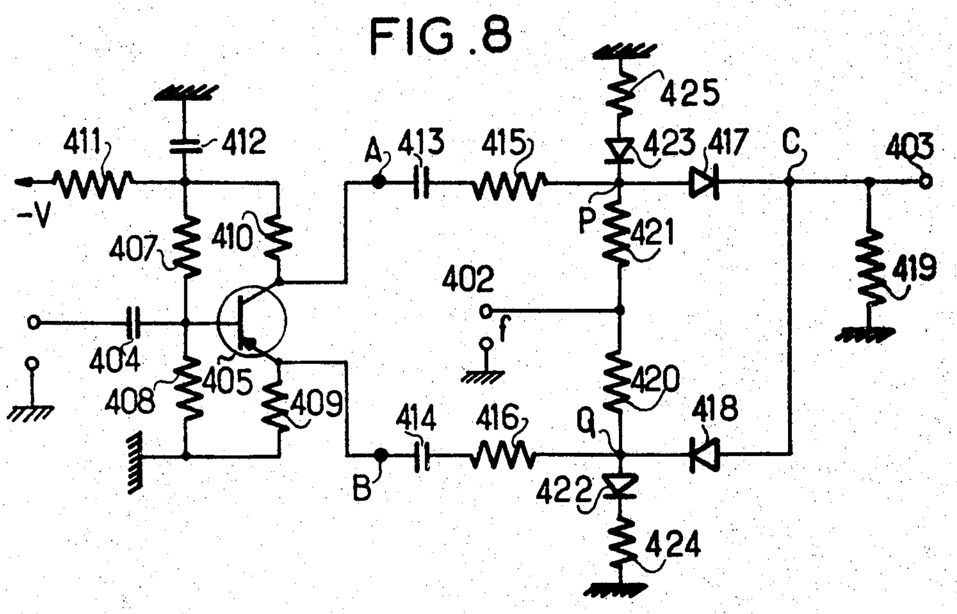
FIG. 8 is a schematic circuit diagram of a form of the modulator circuit according to the invention employing diodes.

In FIG. 8 a modulator of the cut-off type is comprised by three energization terminals asymmetric in relation to earth: a first input terminal 401 on which one can apply the carrier frequency F, a second input terminal 402 on which one can apply the signal frequency $f$ and an output terminal 403 on which can be transmitted the modulation products $(F+f)$ and $(F-f)$. The input terminal 401 is connected via a capacitor 404 to the base of a transistor 405 mounted with common emitter, the said transistor 405 being polarized as is known to those skilled in the art. The base is connected at the common connection to two resistors 407 and 408, the emitter to a resistor 409 connected to earth and the collector to a resistor 410 in series with a resistor 411 decoupled by a capacitor 412 and connected to a terminal of negative voltage V, the resistor 407 being connected at the common connection to resistors 410 and 411.

The collector of the transistor 405 is connected at A via a capacitor 413 in series with a resistor 415, at P to a first electrode of a first diode 417 connected at C in series with a second diode 418. The emitter of the transistor 405 is connected at B via a capacitor 414 in series with a resistor 416 at Q to a first electrode of the said diode 418, the said first electrodes of the diode 417 and 418 in series being of opposite polarity.

The input terminal 402 is connected at the common connection to two resistors 420 and 421 respectively connected to the said first two electrodes at Q and P of the diodes 418 and 417. The second two electrodes of the said diodes 417 and 418, connected at C, are connected in common to the said output terminal 403 formed by one end of a load resistor 419, the other end of which is connected to earth. A diode 423 connected to an earthed resistor 425 and a diode 422 connected to an earthed resistor 424 are connected respectively to P and Q.

The functioning of the assembly shown in FIG. 8 is as follows: when the carrier frequency F is applied to the input terminal 401, the voltages which appear at A and B are in phase opposition, their amplitudes being made equal by regulation of the resistors 409 and 410.

In a first phase, for the alternations of the carrier frequency F while the potential of the collector is negative and the potential of the emitter is positive, i.e. the potential at P is negative and that at Q is positive, the diodes 417 and 418 are both blocked and accordingly no current passes in the load resistor 419.

In a second phase, for the alternations of the carrier frequency F making the potential of the collector positive and that of the emitter negative, i.e. the potential is positive at P and negative at Q, the diodes 417 and 418 are both passing current, but by reason of the symmetry existing between the two circuits collector of 405—diode 417 and emitter of 405—diode 418, the voltage cancels itself out at C and no current resulting from the carrier frequency can appear in the load resistor.

When the signal frequency $f$ is applied to the input terminal 402, the said signal frequency being at a sufficiently low level for the state of the diodes 417 and 418 to be controlled by the carrier frequency F, the signal frequency $f$ will be transmitted by the two diodes 417 and 418 solely during those alternations of the frequency F during which the diodes are passing current.

Such an assembly accordingly produces a cut-off modulator for the signal frequency $f$ at the frequency of the carrier frequency F, the latter being totally eliminated, together with all its components, from the output spectrum. It can be seen that the diodes 423 and 422 connected at A are blocked when the diodes 417 and 418 are conductive, and vice versa. It follows that during the first phase while the diodes 423 and 422 are passing current, their low impedance ensures decoupling between the two energization terminals 401 and 402. During the second phase this decoupling is ensured by the diodes 417 and 418. The two diodes 423 and 422 in actual fact are not indispensable for ensuring the proper functioning of the modulator, but they permit its input impedance with respect to the terminal 402 to be kept at a constant value, and ensure improved decoupling between the terminals 401 and 402.

Figure 9:
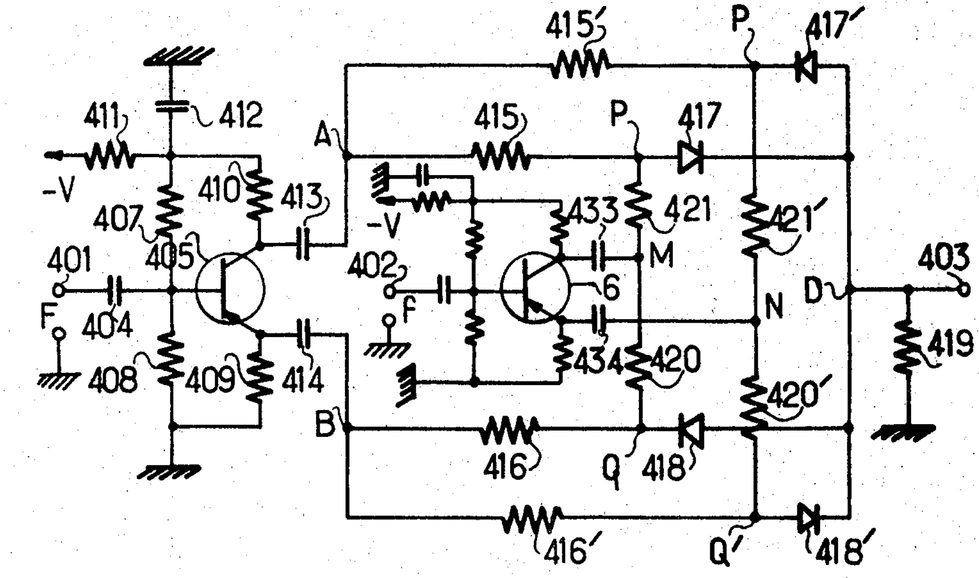
FIG. 9 is a modified form of the circuit shown in FIG. 8 wherein the inversion type modulation can be accomplished.

FIG. 9 shows a second type of modulator constructed in accordance with the invention. In this figure the elements analogous to those of FIG. 8 have been given the same reference numbers, or the same with the addition of prime.

In FIG. 9 the collector of transistor 405 is connected via the capacitor 413 on the one hand to the resistor 415 connected at A to two first diodes 417 and 418 in series, and on the other hand to a resistor 415′ connected at P′ to two second diodes 417′ and 418′ in series. In the same way, the emitter is connected via the capacitor 414 on the one hand to the resistor 416 connected at B to two first diodes in series 418 and 417 and on the other hand to a resistor 416′ connected at Q′ to the two second diodes in series 418′ and 417′. The connections at P and P′ of the resistors 415 and 415′ are made respectively to two electrodes of the diodes 417 and 417′ having opposite polarity. Similar connections are made at Q and Q′ of the resistors 416 and 416′ to two electrodes respectively, of opposite polarity, of the diodes 418 and 418′.

The four diodes 417, 418 and 417′, 418′ are connected in common at D to one end of the load resistor 419, which end forms the output terminal 403. In this assembly, the supply terminal 402 for the signal frequency *f* is constituted by the connection of the common terminal to the resistors 421–422 on the one hand, or to the resistors 421′–422′ on the other hand, respectively via a capacitor 433 or a capacitor 434, by the collector or the emitter of a transistor 406, whose base is connected to the input terminal 402 via a capacitor 428. The transistor 406 mounted with common emitter is polarized in the known way indicated in FIG. 9.

In a first phase, for the alternations of the carrier frequency making the potential at P and P′ negative, the potential at Q and Q′ is positive, the two diodes 417 and 418 forming a first pair are blocked whereas the two diodes 417′ and 418′ forming a second pair are passing current. In the second phase, the potentials at A and A′ are positive, and those at Q and Q′ are negative, the diodes 417–418 are conductive, and the diodes 417′–418′ are blocked. It results that when the signal frequency *f* is applied to the terminal 402, the modulation current is passed through the load resistor 419 during the two phases mentioned, with inversion of the signal frequency *f* from one phase to the next. Such an assembly accordingly operates as an inversion modulator in which the modulation current has no component at the carrier frequency F.

In FIG. 9 the elements such as 423–425 and 422–424 connected at P and Q in the said figure, have not been shown. Such elements can be connected at P and Q, as well as the analogous elements at P′ and Q′, to ensure regularity of input impedance of the modulator and improved decoupling between the terminals 401 and 402.

An evaluation will now be given of these various assemblies taken as a whole.

From the viewpoint of the output spectrum, the various modulators of the invention are classified in the following way:

FIG. 1 (cut-off), $F \pm f$, $f$, 2KF
FIGS. 6, 8 (cut-off), $F \pm f$, $f$
FIGS. 2, 3, 4, 5 (inversion), $F \pm f$, 2KF
FIGS. 7, 9 (inversion), $F \pm f$ By "$F \pm f$," it is necessary to understand, is meant the series of the components $F \pm f$, $3F \pm f$, $5F \pm f$, and so on, carried out in principle by the coefficients in uneven harmonic series 1/1, 1/3, 1/5, and so on.

It can be seen that the assemblies with complementary transistors of FIGS. 7 and 8′, as well as the assemblies with diodes (FIGS. 9 and 10) do not supply any 2KF component, which is an obvious advantage.

The assemblies with transistors of the same polarity (FIGS. 1, 2, 3, 4, 5) have the advantage of a greater simplicity of construction. Among them, the assemblies of FIGS. 4 and 5 are distinguished by their structural symmetry, which ensures for them more stable functioning conditions.

The same symmetry of structure is found again, with its attendant advantages, in the circuits of FIGS. 6, 7, 8, 9. The first two concern modulators with complementary transistors. In the last two, the role of the transistors is taken over by the diodes.

The circuit of FIG. 6 is to be recommended for its extreme simplicity, since it comprises in all two complementary transistors. On the other hand, it does not have the same guarantee of regularity of impedance as the others.

Compared with the ring modulator taken as reference, all the assemblies with transistors have the advantage of a gain in power. This advantage is particularly great in relation to weak signal noise ratios, since its nature is to increase this ratio.

The decoupling of the impedances upstream and downstream of the modulator is excellent, whereas the ring modulator because of its completely bilateral nature, needs extensive adaptation precautions to be taken in the case of selective terminations. Otherwise deformations occur in the attenuation/frequency characteristics of the loop filters on a ring modulator, this disadvantage being overcome by the modulators of the invention.

In the assembly of FIGS. 8 and 9, the loop resistor as well as the derivation resistors constitute a source of coupling between the frequency carrier source and the signal frequency source. To reduce the said coupling to a low value it is necessary to reduce the said resistors to a very low value and possibly connect at the output an amplifier with low input impedance. Suitable amplifiers for this purpose are known having input impedances for instance on the order of 1 ohm, equipped with a voltage counter-reaction.

The advantage of the two diode modulators of FIGS. 8 and 9 over transistor modulators is that they tend to function at higher frequency. In actual fact it is known at the present time that the reversing time of a diode is less than that of a transistor, and as a consequence these circuits are used with advantage for frequencies of for instance tens of mh.

Having described several embodiments of new and improved electronic modulators constructed in accordance with the invention, it is believed obvious that other modifications and variations of the present invention are possible in the light of the above teachings. It is therefore to be understood that changes may be made in the particular embodiments of the invention described which are within the full intended scope of the invention as defined by the appended claims.

We claim:

1. An inversion modulator comprising two transistors of the same polarity mounted with common base, a carrier frequency source F being applied by means of a capacitor to the base of a third transistor mounted as a symmetrizing dephaser with a resistor in the collector circuit and a resistor in the emitter circuit, which applies two output voltages with carrier frequency in opposition to the emitters of the said first two transistors via two networks consisting of a capacitor and a resisor, and a signal source being connected by means of a capacitor to the base of a fourth transistor mounted as a symmetric dephaser with a resistor in the collector circuit and a resistor in the emitter circuit which applies two signal frequency voltages in opposition to the said two emitters of the transistors via two resistance capacity networks.

2. A modulator as claimed in claim 1, in which two diodes are connected between the emitters of the said transistors respectively and earth.

3. A modulator as claimed in claim 1 in which the said two transistors are mounted with common emitter and are energized by their bases.

4. An electronic modulator using noninductive circuit components and having asymmetric signal input terminals, asymmetric carrier frequency input terminals and asymmetric output terminals comprising an output resistor having said asymmetric output terminals coupled thereacross, at least two solid state semiconductor components each having their outputs connected in common across said output resistor and having the inputs thereof operatively coupled to respective ones of said asymmetric signal input terminals and said asymmetric carrier frequency input terminals, and noninductive circuit means for dephasing the carrier frequency output of one of said semiconductor components relative to the other to thereby eliminate at least one undesired parasitic frequency in the output spectrum of said modulator, two complementary transistors and one single D.C. source, wherein from the negative pole of the D.C. source, the collector of the first PNP transistor whose emitter is connected to earth via a load resistor, on the one hand a resistor in series with the emitter of a second NPN transistor, whose collector returns to earth via the said load resistor, the base of the first transistor being connected to earth via a polarization resistor, the base of the second transistor being connected to the emitter of the same transistor by a polarization resistor and to the base of the first transistor by a capacitor, the carrier frequency and signal frequency terminals being applied to the base of the first transistor via two resistors respectively.

5. An electronic modulator using non-inductive circuit components and having asymmetric signal input terminals, asymmetric carrier frequency input terminals and asymmetric output terminals comprising an output resistor having said asymmetric output terminals coupled thereacross, at least two solid state semiconductor components each having their outputs connected in common across said output resistor and having the inputs thereof operatively coupled to respective ones of said asymmetric signal input terminals and said asymmetric carrier frequency input terminals, and noninductive circuit means for dephasing the carrier frequency output of one of said semiconductor components relative to the other to thereby eliminate at least one undesired parasitic frequency in the output spectrum of said modulator, a pair of complementary transistors mounted with common base, having their collectors loaded by resistors, their emitters energized on the one hand by two output voltages in phase opposition of a symmetrizing dephaser transistor connected at its base to the carrier frequency terminals, and on the other hand in parallel via two resistors with the signal frequency terminals, the transistors of the said pair having their collectors connected via two capacitors to one terminal of the common load resistor, whose other terminal is connected to earth.

6. A modulator as claimed in claim 5 in which the complementary transistors associated in pairs are mounted with common emitter and energized by the base.

7. A modulator as claimed in claim 6 in which a diode is mounted between each energization point of the complementary transistors associated in pairs, to regularize the impedance.

8. An electronic modulator using noninductive circuit components and having asymmetric signal input terminals, asymmetric carrier frequency input terminals and asymmetric output terminals comprising an output resistor having said asymmetric output terminals coupled thereacross, at least two solid state semiconductor components each having their outputs connected in common across said output resistor and having the inputs thereof operatively coupled to respective ones of said asymmetric signal input terminals and said asymmetric carrier frequency input terminals, and noninductive circuit means for dephasing the carrier frequency output of one of said semiconductor components relative to the other to thereby eliminate at least one undesired parasitic frequency in the output spectrum of said modulator, two pairs of complementary transistors and a first symmetrizing dephaser transistor with two output terminals having its base connected to the carrier frequency terminals, a second symmetrizing dephaser transistor with two output terminals having its base connected to the signal frequency terminals. a first pair of complementary transistors mounted with common base each having collectors loaded by a resistor and the emitters energized by the said terminals via two resistors and by the said terminal via two resistors, a second pair of complementary transistors mounted with common base, each having collectors connected to the collector of the same polarity of the said first pair, and the emitters energized crosswise by the first mentioned two terminals via two resistors and by the second mentioned two output terminals via two resistors, the common load resistor having one terminal connected at the common point to the collectors of the two transistors of a first polarity via a capacitor and connected at the common point to the collectors of the two transistors of a second polarity via a capacitor, and the other terminal connected to earth.

9. A modulator as claimed in claim 8 in which the complementary transistors associated in pairs are mounted with common emitter and energized by the base.

10. A modulator as claimed in claim 9 in which a diode is mounted between each energization point of the complementary transistors associated in pairs, to regularize the impedance.

11. An electronic modulator using noninductive circuit components and having asymmetric signal input terminals, asymmetric carrier frequency input terminals and asymmetric output terminals comprising an output resistor having said asymmetric output terminals coupled thereacross, at least two solid state semiconductor components each having their outputs connected in common across said output resistor and having the inputs thereof operatively coupled to respective ones of said asymmetric signal input terminals and said asymmetric carrier frequency input terminals, and noninductive circuit means for dephasing the carrier frequency output of one of said semiconductor components relative to the other to thereby eliminate at least one undesired parasitic frequency in the output spectrum of said modulator, a transistor mounted as a symmetrizing dephaser with two output terminals, connected at its base to the carrier frequency terminals, the said output terminals energizing via two resistance capacity networks two diodes orientated oppositely, which return to earth via a common resistor, the signal frequency terminals energizing the said two diodes at the mid point of a bridge of resistors which connects them.

12. A modulator as claimed in claim 11, characterized in that diodes regulating the impedance are connected between each of the said diodes and earth, preferably in series with a resistor.

13. An electronic modulator using noninductive circuit components and having asymmetrical signal input terminals, comprising an output resistor having said asymmetric output terminals coupled thereacross, at least two solid state semiconductor components each having their outputs connected in common across said output resistor and having the inputs thereof operatively coupled to respective ones of said asymmetric signal input terminals and said asymmetric carrier frequency input terminals, and noninductive circuit means for dephasing the carrier frequency output of one of said semiconductor components relative to the other to thereby eliminate at least one undesired parasitic frequency in the output spectrum of said modulator, a first transistor mounted as a symmetrizing dephaser with two output terminals and connected at its base to the carrier frequency terminals, a second transistor mounted as a symmetrizing dephaser with two output terminals and connected at its base to the signal frequency terminals, a first assembly of two arms in parallel, each formed of a resistor and a diode, one of which is oriented oppositely to the other arm, one end of which is connected to one of the second transistor output terminals and the other end to one end of a load resistor which returns to earth, a second assembly of identical constitution to the first assembly, one end of which is connected to the other of the second transistor output terminals and the other end to the end of the said resistor, a first pair of resistors connecting two diodes of differing orientation in the two different assemblies and having their mid point connected to one output terminal of said first transistor, a second pair of resistors connecting the other two diodes of the two different assemblies having their mid point connected to the other of said terminals of said first transistor.

References Cited

UNITED STATES PATENTS 3,229,230 1/1966 Feldman ---------- 325—49 X

ROY LAKE, Primary Examiner

L. J. DAHL, Assistant Examiner

U.S. Cl. X.R.

332—23